United States Patent [19]

Broughton

[11] Patent Number: 4,631,860

[45] Date of Patent: Dec. 30, 1986

[54] METHOD FOR PRE-GERMINATING SEEDS

[76] Inventor: Robert I. Broughton, 7623 Saskatchewan Drive, Edmonton, Alberta, Canada, T6G 2A6

[21] Appl. No.: 624,729

[22] Filed: Jun. 26, 1984

[51] Int. Cl.$^4$ .............................................. A01C 1/00
[52] U.S. Cl. ................................... 47/58; 47/DIG. 9
[58] Field of Search .............................. 47/58, DIG. 9

[56] References Cited

U.S. PATENT DOCUMENTS

| | | | |
|---|---|---|---|
| 1,846,510 | 2/1932 | Busse | 47/58 |
| 2,932,128 | 4/1960 | Porter et al. | 47/58 |
| 2,954,643 | 10/1960 | Porter et al. | 47/58 |

FOREIGN PATENT DOCUMENTS

| | | | |
|---|---|---|---|
| 877933 | 8/1971 | Canada | 47/DIG. 9 |
| 922132 | 5/1947 | France | 47/DIG. 9 |
| 70206 | 2/1961 | India | 47/DIG. 9 |
| 1025350 | 6/1983 | U.S.S.R. | 47/DIG. 9 |

OTHER PUBLICATIONS

Effect of Oxygen—, Dasberg et al, Agronomy Journal, vol. 58, Mar.–Apr. 1966, pp. 206–208.

Primary Examiner—Robert E. Bagwill
Attorney, Agent, or Firm—Stanley E. Johnson

[57] ABSTRACT

A method of promoting germination of seeds and apparatus for carrying out the same. The method involves subjecting a bulk of the seeds to a vacuum for a selected period of time and thereafter subjecting a slurry of water and the seeds to a gas pressure for a selected period of time. The seeds when subjected to a vacuum may be dry or in the form of a slurry of water and seeds. The pressurizing gas is preferably carbon dioxide and the apparatus for carrying out the method may simply be a vessel providing a sealed chamber for holding a slurry of seeds and water. The vessel is adapted for entry and exit of seeds and water into and out of the sealed chamber and apparatus provided for subjecting the chamber firstly to a vacuum and then to a pressure. After the seeds have been subjected to a vacuum and pressure they are removed and excess water is separated from the treated seeds.

9 Claims, 2 Drawing Figures

METHOD FOR PRE-GERMINATING SEEDS

BACKGROUND OF INVENTION

This invention relates to a method for pregerminating seeds before sowing and apparatus for carrying out the method.

In many parts of the world, due to short growing season, crops are at the mercy of the weather especially at the critical harvest. It is well known the growing time of plants can be hastened by starting the germination process and then planting the seeds. The main factor in promoting germination is the moisture content of the seed. Gardeners with small plots have for years soaked the seeds in water prior to planting to hasten the growing time. Soaking of seeds in water is slow and difficult if not impossible to implement commercially and particularly for large scale farm operations.

Pre-soaking of seeds is costly and time-consuming and also leads to the possible entry of bacteria virus, etc. and thus is most undesirable. Furthermore, seeds can be readily over-treated with pre-soaking.

A method for improving the growth characteristics of plant material is disclosed in Canadian Pat. No. 947,504 issued May 21, 1974 to the University of Ottawa. The method disclosed therein consists of soaking the seeds in water and subjecting the seeds to sound vibrations and/or direct vibrations. In the case of sound vibrations, the process is slow as there is soaking time followed by four to five weeks of subjecting the seeds to the sound waves. Subjecting the seeds to direct vibration substantially reduces the time for the process but it is questionable as to whether or not the process as disclosed therein could be scaled up to handle large quantities of seeds in each batch and thus is of questionable commercial viability.

Another proposed method for improving the growth characteristic of plant material involves subjecting the seeds, prior to planting, to an electro-magnetic field. In another proposal, seeds are subjected to high voltage sparks.

An object of the present invention is to provide a method of obtaining fast entry of water through the protective coating surrounding the seeds without any substantial damage to the seed.

Another object of the present invention is to provide a method of promoting the germination of seeds by processing a bulk quantity of seeds at one time thereby providing a commercially viable scale of operation.

In Applicant's attempt to find some method of obtaining fast entry of water through the protective coating surrounding the seed, various experiments were conducted. In one attempt, seeds were bombarded by high voltage sparks of typically 100,000 volts. This produced numerous small holes in the coating and after a soaking in water a significant rise in seeding moisture resulted. The system, however, was deemed too difficult to scale up for a commercially viable operation.

In another attempt, seeds were subjected to pressure while submerged in water by injecting carbon dioxide gas at a pressure of up to 836 p.s.i. This obtained a greater moisture content, but it was noted a portion of the seeds suffered bran damage.

In another attempt, seeds were subjected to a vacuum and as soon as the vacuum was obtained, the seeds were noted to be outgassing violently. After the vacuum was released, the moisture content was found to be about equal to the pressure system with no damage noted.

SUMMARY OF INVENTION

Following the foregoing, experiments were then conducted involving first subjecting the seeds to a vacuum and thereafter to a moderate pressure. Using this system, it was noted the moisture content of the seeds was double that obtained by either the vacuum or pressure system used separately. The treated seeds were found to germinate and sprout very rapidly (inside of about 24 hours) and there appeared to be no damage to the seeds.

In accordance with one aspect of the invention there is provided a method of promoting the germination of seeds comprising placing a selected quantity of seeds in a hermetically sealed vessel; drawing a vacuum in said vessel to subject the seeds to a vacuum; removing the vacuum; subjecting a slurry of water and said seeds to a gas pressure for a selected period of time in said vessel; and discharging the treated seeds and water from the confined space.

In accordance with a further aspect of the present invention, there is provided apparatus for carrying out the foregoing method.

LIST OF DRAWINGS

The invention is described in more detail hereinafter and in reference to the accompanying drawings wherein:

FIG. 1 is a diagrammatic elevational view of one form of apparatus for carrying out Applicant's method; and FIG. 2 is a vertical elevational view of another form of apparatus for carrying out Applicant's method.

DESCRIPTION OF PREFERRED EMBODIMENTS

Figure 1:
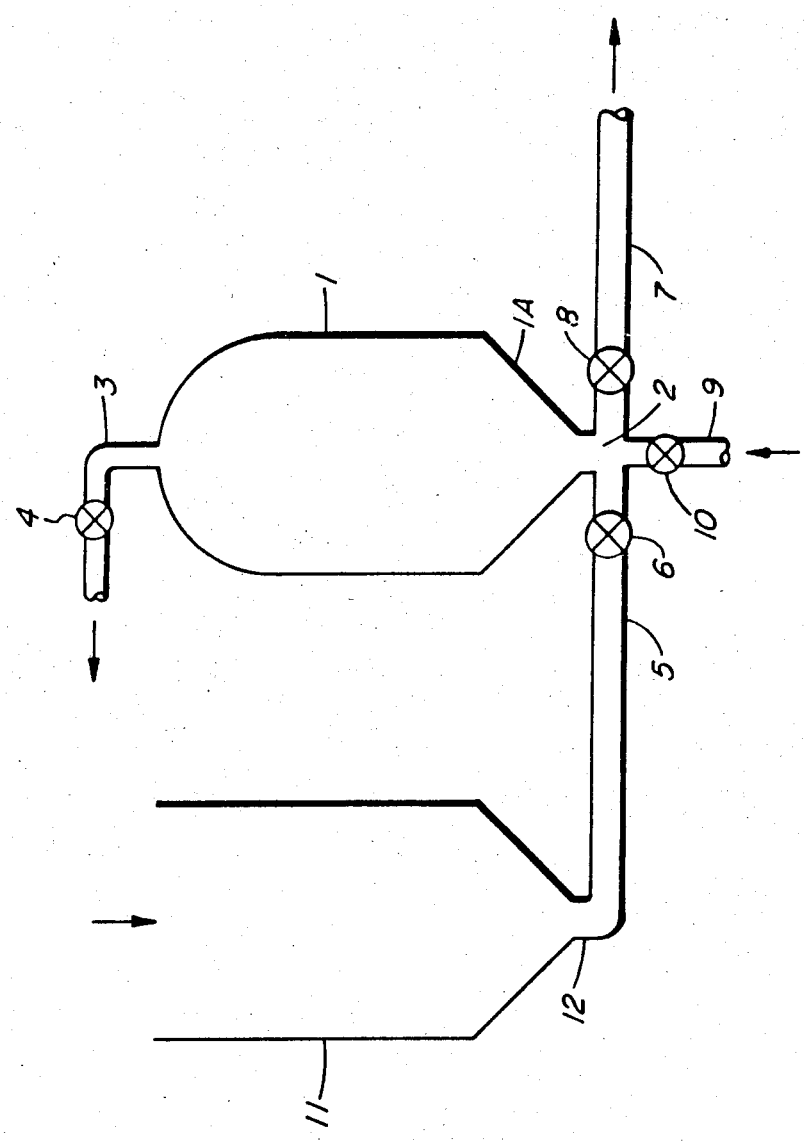

Applicant has through tests, discovered that the germination of seeds can be promoted by putting seeds and water in a container and subjecting them to either pressure or vacuum or first a vacuum and thereafter a pressure. The pressure system was noted to cause some bran damage, while the vacuum system did not. Applicant however, further discovered that using a combination of vacuum first, followed by moderate pressure of $CO_2$ results in having the seeds with the moisture content substantially double of that obtained by either the vacuum or pressure system used separately.

Tests have been run placing the seeds under a vacuum for three minutes followed by the admittance of carbon dioxide at various pressures down to 25 p.s.i. for a further three minutes, making a total of six minutes treating time. The samples germinated readily (inside of 24 hours) and exhibited no sign of damage.

In various tests, samples were germinated and grown to about 8 to 12 centimetres in conjunction with control samples of untreated seeds. In each case, dry untreated seeds were used as a control and compared to the growing of the treated seeds. In every case the treated seeds germinated faster, grew to a greater height in the same time, and exhibited a more robust root system. It was also noted that hair roots appeared faster in the treated samples and grew with great abundance compared to the untreated seeds. It was noted during the vacuum cycle a number of small air bubbles clung to the seeds. This could have the disadvantage of having the seeds draw back in the gas when the seeds are subjected to pressure. This problem, however, is readily solved by placing a small amount of wetting agent for example, Amway LOC which is an ammonium laureth sulphate, in the water at the start of a treating cycle. This enables the small bubbles to leave the seeds freely and be drawn away by the vacuum pump. If desired, various plant stimulants or growth hormones can be added to the treating water and be drawn into the seed on the pressure cycle.

The process effectively makes the seed coating (bran) pervious and should one wish to guard against the egress of moisture out of the seed, especially in the event the seeds are being sown in comparatively dry soil, the seeds, after being treated, can be subjected to a separate operation to seal the outer layer. This further operation consists of treating the seeds by spraying or dipping them in a suitable sealing solution or water repellant.

An observation made during experiments was that on the vacuum/pressure plus wetting agent treatment system, the grain seeds, after draining off the treating solution, were surprisingly dry and not sticky as wet grain normally is. The seeds required very little, if any drying before sowing. It was also noted that due to the increased size of the treated seeds, (about one third greater) the drill metering adjustment had to be opened to achieve the same number of bushels per acre when sowing. The seeds should be sown within 24 hours after treating to eliminate any damage to sprouted grain. Test seeding was carried out on numerous farms within a 70 mile radius with respect to wheat, barley, rape, corn, and cucumbers. The total acreage involved was approximately 1,500 acres with seeding being done in steps, 50% treated and 50% untreated as a control. On examination of all of the plots, all of the plants from the treated seeds were considerably advanced both in height, sturdiness and showed a much advanced root structure. When the crops were harvested in the Fall, the following results were noted:

(1) Yield Increase on treated seeds (Average)
Wheat—30%
Barley—50%
Rape—52%
Corn—50%
Cucumber—60%+

(2) Weed Control
On treated plots the plants progressed so rapidly there was a choking effect on weed growth which showed up at the elevator.
Elevator Dockage—treated 4%; untreated 12%

(3) Harvest Time
Harvest on the treated plots was an average of 2 weeks earlier compared to untreated. This is a very important factor due to the ever present threat of frost.

(4) Root Structure
Roots of the plants on treated plots were deeper and much more developed with many more rootlets. Stalks also were much thicker.

A test was also conducted with Canola seeds. After harvesting, it was found that the untreated yielded 22 bushels to the acre, while the treated seeds yielded 36 bushels to the acre. The test was also conducted using klondike barley wherein 7.5 acres were seeded using treated seeds and 7.5 acres seeded utilizing untreated seeds. The plot of untreated seeds yielded 23.16 bushels per acre, while the other plot with the treated seeds yielded 32.69 bushels per acre. The weed dockage for the treated area was 4% while the weed dockage for the untreated was 12%. This weed reduction was noted in all test areas and they all showed on average an early maturity of two weeks for the treated portion of the test areas.

In the drawings, there is illustrated two different apparatuses for batch treatment of seeds wherein the seeds are first subjected to a vacuum and then while in a slurry a pressure of preferably $CO_2$ gas.

Referring to FIG. 1, there is illustrated a main treating tank 1 which is generally cylindrical in form (or ball shaped if so desired) with the lower end having inwardly sloping outer wall 1A connected by way of a T-coupling 2 to respective ones of inlet pipe 5 and outlet pipe 7. The main treating tank 1 is constructed and designed to withstand a substantial vacuum as well as substantial pressure, for example 100 p.s.i. or more. A pipe or conduit 3 is connected to the upper end of the tank 1 and this pipe has a valve 4 therein. The valve 4 may be for example, a Grenell ¾ inch 1550 bell type valve. Inlet conduit 5 and outlet conduit 7 have respective valves 6 and 8 therein, which for example may be of the butterfly type. Valves suitable for this are Grenell 3 inch W8290 valves available from I.T.T. Industries of Canada. An inlet gas pipe 9 is connected to the conduit containing valve 6 and 8 and at a position therebetween. The gas inlet pipe 9 has a valve 10 therein which may be of the bell type, for example a Grenell ¾ inch 1550 valve available from I.T.T. Industries of Canada.

There is an open top hopper 11 having a bottom outlet 12 which is connected to the inlet pipe 5.

Operation of the tank-type seed treater illustrated in FIG. 1 is as follows:

Valves 6, 8 and 10 are initially closed and valve 4 open to draw a vacuum in tank 1. Hopper 11 is half filled with water of a neutral pH value and seeds to be treated are then placed in the hopper. Valve 6 is then opened and by virtue of the vacuum in tank 1, the contents are sucked from the hopper 11 into the tank 1. Inlet valve 6 is then closed and tank 1 is maintained under a vacuum for approximately 3 minutes. This time will vary somewhat depending upon the type of seed being treated. Valve 4 is then closed and gas valve 10 opened admitting gas (typically carbon dioxide) at a pressure of approximately 25 p.s.i. for typically three minutes. This time and pressure of course can vary. Good results, however, have been obtained utilizing the times and pressure indicated. The treated seeds are emptied from the tank by opening outlet valve 8. The pressure in the tank 1 causes the contents to flow out through the outlet pipe 7. The treated seeds are separated from the water and the treated seeds may require slight drying to enable immediate planting. The previously mentioned use of a wetting agent (for example Amway L.O.C.) has been found to reduce and even eliminate the drying operation. After the tank 1 has been emptied, the apparatus is ready for treating the next batch of seeds. The valves may be manually, electrically, hydraulically or air operated or various combinations thereof. Control of the valves may be automated and activated by a timer if so desired.

The apparatus illustrated in FIG. 1 may be mounted permanently at a suitable location, or alternatively mounted on a trailer so as to be mobile and movable from one location to another. The seeds and water discharged from the outlet pipe 7 are separated by, for example, passing the seeds over a screen; the water being reclaimed for the next batch, with the addition of make-up water. It has been found that each bushel will take on approximately two gallons of water. Typically, the apparatus in FIG. 1 would be utilized to treat 50 bushels of for example, wheat per hour. This however, can be scaled up or down in size to meet requirements.

Figure 2:
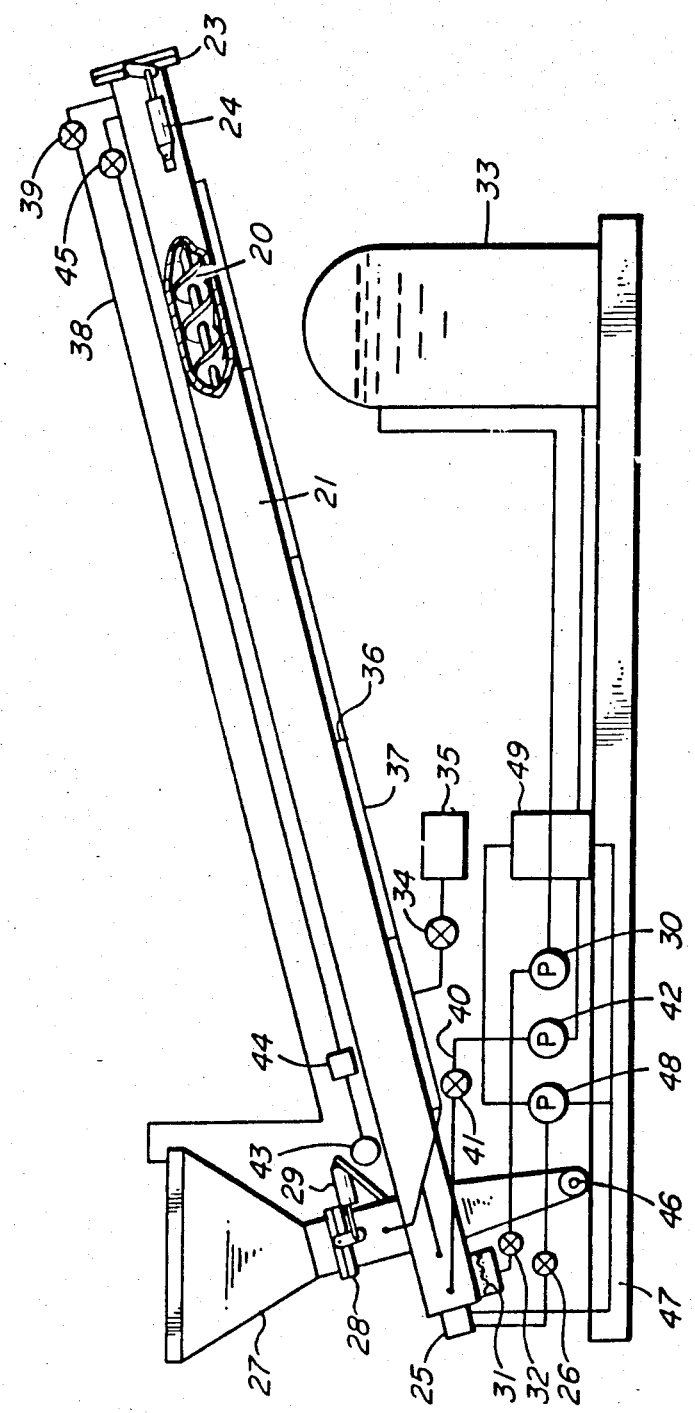

Another form of apparatus for commercial treatment of the seeds with an acceptable through-put is illustrated in FIG. 2. Referring to FIG. 2 there is illustrated an auger 20 enclosed in an auger tube 21 in which the seeds are treated. The upper outlet end of tube 21 has an outlet valve 23 therein, which for example may be a Grinell 10 inch butterfly valve operated by a hydraulic cylinder 24. The auger is driven by a power source 25 for example a hydraulic or electric motor controlled by way of an electrical solenoid valve 26.

The auger tube 21 is filled with a slurry of seeds and water from an inlet hopper 27 through an inlet valve 28, for example a Grinell 10" butterfly valve, actuated by hydraulic cylinder 29. At the lower end of the auger tube 21 there is a water outlet connected to a water pump 30 through a filter screen 31 and an electrical solenoid control valve 32. The water pump 30 is connected to a water storage tank 33 by way of suitable piping.

A solenoid valve 34 controls a supply of carbon dioxide gas from a source 35 at a pressure of typically 25 p.s.i. to a number of inlets 36 into the auger tube by way of manifold 37.

A surveillance pipe line 38 is connected at one end thereof to the upper end of the auger tube 21 and the other end is open ended discharging into the upper end of hopper 27. An electrical solenoid valve 39 is in the line 38.

A water delivery line 40 having an electrical solenoid valve 41 therein controllably supplies water to the lower end of the auger tube 21 from the water storage tank 33 by way of a water pump 42.

A vacuum pump 43 is connected by way of suitable piping through an air-water separator 44 (for example, a Wilkerson dry filter M 31—C 4—000) and an electrical solenoid valve 45 to the upper end of the auger tube 21.

The auger tube 21 and inlet hopper assembly 27 as a unit are mounted on a pivot 46 to a bed structure 47 which may take the form of a skid or trailer bed. The pivot 46 permits lowering the auger tube 21 for highway clearance in moving from one site to another.

A hydraulic pump 48 supplies hydraulic pressure to operate the valve and hydraulic motor 25 driving the auger. The hydraulic system includes a reservoir or storage tank 49.

The size of the foregoing unit may be scaled up or down to suit requirements of the user or to treat special seeds such as fir seeds, Canola, alfalfa, etc. The valves can be operated by air, hydraulics or electricity or can be manual and operable by means of mechanical linkages. Operation of the valves may be automated to any degree required, well within the skill of anyone knowledgeable in that field.

Operation of the foregoing auger type seed treating apparatus is as follows:

Seeds to be treated are placed in the hopper 27 inlet valve 28 being open and outlet valve 23 being closed. Surveillance valve 39 is open and the gas inlet valve 34, water inlet valve 41, vacuum valve 45 and water outlet valve 23 are all closed.

The valve 26 to hydraulic motor 25 is open, starting rotation of the auger 20 and the water supply control valve 41 is opened. A slurry of water and seeds starts to fill the auger tube 21 and when the slurry reaches the top end of the tube, water flows through the surveillance valve 39, line 38 and discharges into the hopper 27. This signals that the tube 21 is full. At this point, the auger 20 is stopped and water inlet valve 41 is closed. Inlet valve 28 is then closed as is also surveillance valve 39 and vacuum control valve 45 is opened, drawing a vacuum on the tube and thus subjecting the seeds to an outgassing condition for typically three minutes. Vacuum control valve 45 is closed and gas supply control valve 34 opened. This subjects the seeds in the auger tube 21 for typically 3 minutes to a pressure of typically 25 p.s.i. This pressure, however, may be varied to suit the particular seed type. The gas supply valve 34 is then closed and pressure in the auger tube is relieved by opening surveillance valve 39. The upper outlet valve 23 is then opened as is also water drain control valve 32. Water in the auger tube 21 is pumped out through screen 31 and returned to the water storage tank 33. The auger drive motor 25 is then started, by operation of the control valve 26, driving the auger thereby delivering the treated seeds out of the upper end of the auger tube. The treated seeds may be discharged into a seed dryer should drying be necessary and the treated seeds should be planted within 24 hours to avoid damage to the sprouts.

From the foregoing it will be seen there is a simple means of treating seeds for germination of the same and apparatus for carrying out the method. The method basically consists of placing seeds and water in a confined space (hermetically sealed vessel), subjecting them firstly to vacuum for a selected period of time and then subjecting them to a pressure for a selected period of time. The treatment time for each batch is approximately 6 minutes whereafter the treated seeds are ready for planting immediately.

In the foregoing there is presented a method and apparatus for pre-germinating seeds, from which there also follows the advantages resulting therefrom.

Seeds are normally planted by a mechanical drill or seeder, depositing the seeds in rows and at a suitable depth dependent upon the seed to ensure adequate moisture for germination. The space between the rows leaves an area for proliferation of weeds which utilize fertilizers and moisture otherwise which should be available to the planted seeds. As previously indicated, the planting of pre-germinated seeds results in early growth and tests have shown from this the dockage or weed content upon harvesting has been substantially reduced. In addition to this, pre-germinated seeds can be distributed on the ground by broadcast seeding thereby resulting in a random placement of the seeds eliminating rows in which weeds can grow. Broadcast seeding can be carried out by various means which eliminates equipment that travels over the area to be seeded. Pre-germinated seeds have the capability to sprout and immediately send down a root to reach adquate moisture. This results in the advantages of:
(i) less land preparation in critical planting time;
(ii) early planting; and
(iii) permits the possibility of sowing before the land otherwise would be in condition to support a drill-type seeder due to excess moisture.

Broadcast sowing also places the seeds in a random pattern, leaving no inter-row basis for weeds to grow successfully. The random growing of the plants enhances a choking effect on weeds which otherwise might possibly grow. There also results a moisture conservation because of less land preparation being required in order to accept pre-germinated seeds for growing as opposed to planting untreated seeds.

From the foregoing, the invention has been described with reference to pre-germinating seeds for the purpose of enhancing plant growth increasing the yield of the crop and reducing weed content. It also has applications in other areas such as forming sprouts on barley for malt purposes, pre-germinating rice prior to being seeded and pre-germinating plants for growing sprouts that are later removed and used as a food product.

In the foregoing description it will be noted the slurry of water and seeds is first subjected to a vacuum and then pressure. Good results can also be obtained by subjecting a batch of dry seeds to a vacuum, thereafter forming a slurry of water and seeds and then subjecting the slurry to a gas pressure. In such instance the vacuum in the vessel can be utilized to draw in the water to form the slurry prior whereafter the slurry is subjected to a gas pressure.

I claim:

1. A method of causing formation of sprouts on seeds earlier than normal and improving crop yields resulting from said seeds which comprises the steps of:
    (a) placing seeds in a sealed vessel and subjecting the seeds in said vessel to a pressure of less than atmospheric pressure for a selected period of time;
    (b) releasing the pressure and mixing with water to form a slurry of water and seeds in the sealed vessel;
    (c) subjecting said slurry of water and seeds in a sealed vessel to a gas pressure of greater than atmospheric pressure while maintained in said vessel, whereby the moisture content in said seeds is substantially increased from said combination of a pressure of less than atmospheric and a pressure of greater than atmospheric, and said seeds increase in size; and
    (d) sowing said seeds, whereby germination of said seeds occurs within 24 hours of said treatment steps.

2. A method according to claim 1 wherein the seeds are dried prior to sowing.

3. A method according to claim 1 wherein the steps of subjecting the seeds to a pressure of less than atmospheric pressure and subjecting the slurry of seeds and water to a pressure of greater than atmospheric pressure, requires a total time period of about 6 minutes and wherein said gas pressure is carbon dioxide gas.

4. A method according to claim 1 wherein water is mixed with the seeds in step (a) prior to subjecting to a pressure of less than atmospheric.

5. A method according to claim 2 wherein a wetting agent is included in said water and seed slurry to reduce drying time.

6. A method according to claim 3 wherein the treated seeds are coated with a sealant prior to sowing to prevent escape of moisure therefrom.

7. A method of causing formation of sprouts on seeds earlier than normal and improving crop yields resulting from seed seeds which comprises the steps of:
    (a) placing said seeds in a sealed vessel and subjecting the seeds in said vessel to a pressure of less than atmospheric pressure for a period of about three minutes;
    (b) releasing the pressure and mixing the seeds with water to form a slurry of water and seeds;
    (c) subjecting said slurry of water and seeds in a sealed vessel to a carbon dioxide gas pressure of 25 psi for a period of about three minutes while maintained in said vessel, whereby the moisture content in said seeds is substantially increased from said combination of a pressure of less than atmospheric and a carbon dioxide pressure of about 25 psi; and
    (d) sowing said seeds, whereby germination of said seeds occurs within 24 hours of said treatment steps.

8. A method according to claim 6 wherein said seeds are dried prior to sowing.

9. A method according to claim 7 wherein a wetting agent is included in said water and seed slurry to reduce drying time, and the treated seeds are coated with a sealant subsequent to drying to prevent escape of moisture therefrom.

* * * * *